Figure 1:
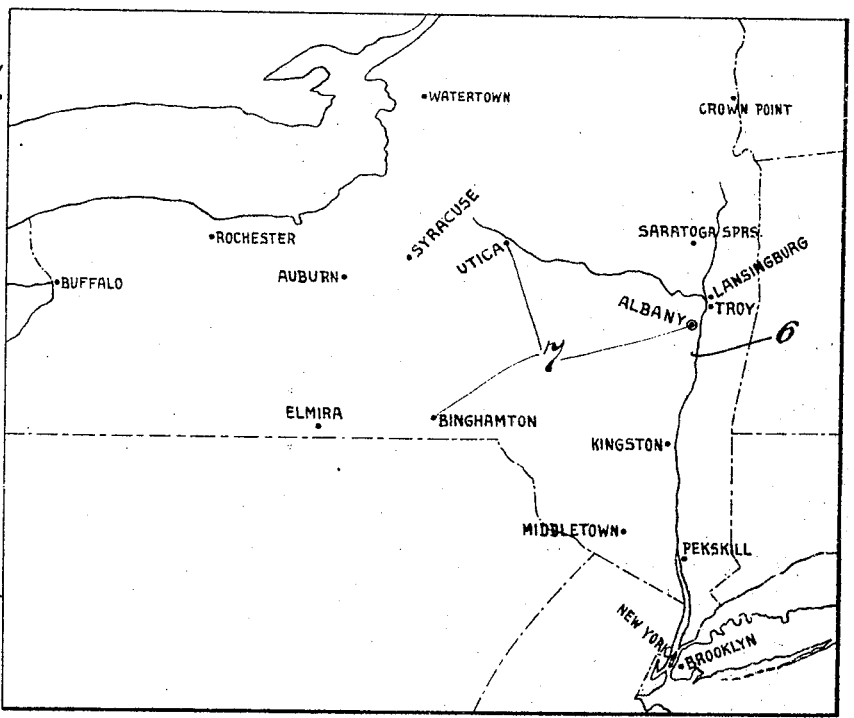

March 10, 1925.

P. ANDERSSON

MAP

Filed Feb. 28. 1923

1,529,414

Inventor
Patrik Andersson
By his Attorney

Patented Mar. 10, 1925.

1,529,414

UNITED STATES PATENT OFFICE.

PATRIK ANDERSSON, OF NEW ROCHELLE, NEW YORK.

MAP.

Application filed February 28, 1923. Serial No. 621,744.

*To all whom it may concern:*

Be it known that I, PATRIK ANDERSSON, a citizen of Sweden, and a resident of New Rochelle, county of Westchester, and State of New York, have invented certain new and useful Improvements in Maps, of which the following is a specification.

This invention relates to maps and has for its primary object to provide a very simple means whereby any town indicated on the face of the map may be easily located.

In one embodiment of my present invention, the map is delineated or printed upon one face of the paper sheet, which may constitute a page in an atlas or other book, and on the opposite face of the sheet the names of the towns or cities within the area covered by the map are printed in alphabetical order. From the name of each town or city, a continuous line extends and terminates at a point opposite the location of such town or city on the face of the map. Thus one desiring to locate a certain town or city has merely to find the name thereof on the obverse face of the sheet and then follow the line extending therefrom. By then using a pin or other marker, upon reversing the sheet, such marker will be found at the precise location of the town on the surface of the map. In those cases where the map is of semiopaque material and is furnished in a separate sheet or a foldable sheet bound in a book, such sheet may be held to the light, and by merely placing the finger at the end of the line extending from the name of the town or city, the corresponding point on the face of the map where the town or city is situated can be easily located so that it is not necessary to mark or otherwise mutilate the paper sheet.

With the above and other objects in view, the invention consists in the improved map and the means for locating towns or cities indicated thereon, as will be hereinafter more fully described, illustrated in the accompanying drawings and subsequently incorporated in the subjoined claims.

In the drawing wherein I have disclosed simple and practical embodiments of the invention and in which similar reference characters designate corresponding parts throughout the several views—

Figure 2:
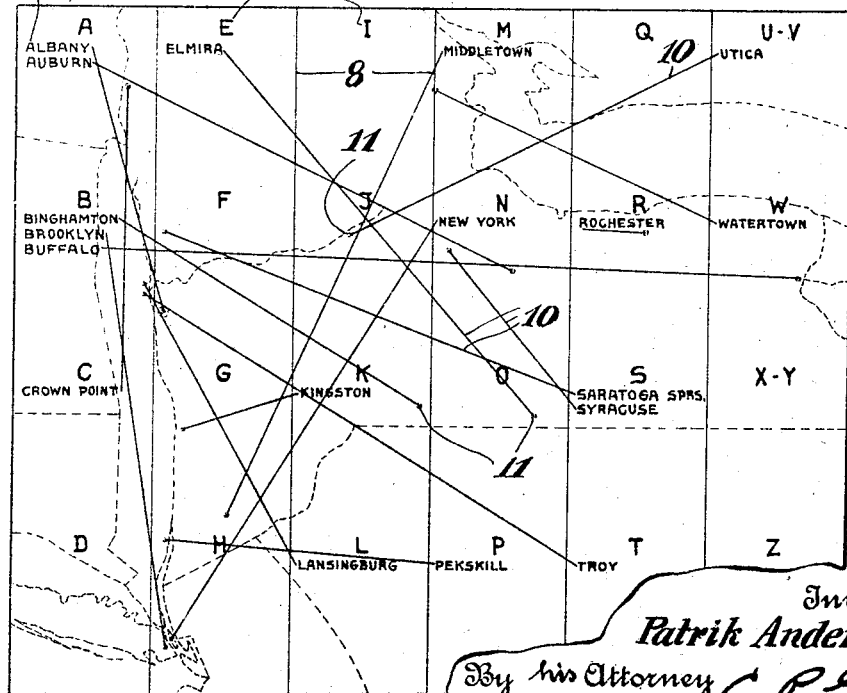

Figure 1 is a plan view of the face of the paper sheet having the map printed thereon; and Figure 2 is a similar view of the obverse face of the sheet.

Referring in detail to the drawing, in the present instance, I have shown the map in outline printed upon one face of the paper sheet 5. For purposes of illustration, I have shown a map of New York State and portions of the adjacent States. It will be understood that these maps may be made in separate sheets for ready reference or my invention might also be employed in connection with such maps as are usually provided in an atlas or other publication bound in book form. The map 6 has the towns and cities of the respective States indicated thereon in a conventional manner, as shown at 7. The surface of the obverse face of the paper sheet 5 is preferably though not necessarily divided by parallel lines 8, and starting from the upper left hand corner of the sheet and suitably spaced vertically from each other, the letters of the alphabet, as shown at 8', are printed. Under each of these letters, the names of all towns or cities indicated on the face of the map having a corresponding initial letter are printed, as shown at 9.

In Figure 2 of the drawing, I have indicated in dotted lines the map on the front face of the sheet, and from each of the names of the cities or towns 9, a continuous straight line 10 extends and terminates at a point 11 which is directly opposite the conventional indication 7 of the town or the city appearing on the map 6.

In the use of the map as above described, assuming for instance that it is desired to locate the town of Auburn, the user observes the name of this town printed on the obverse side of the sheet and then follows the line 10 extending therefrom. At the terminus of this line, with a pin, pencil point or other suitable marker, a perforation or indication may be made so that upon turning the sheet over, such mark will be readily observed on the map 6 at the indication 7 of the town of Auburn thereon. In the present instance, I have indicated only a few of the more important towns and cities in the State of New York in the accompanying drawing, but it will be understood that in the map as it is actually published, there is not only a far greater number of such indications of such small towns, but the principal railroads, rivers, mountains and other indicia also appear on the face of the map. This renders it a more or less difficult and time-consuming task to locate upon such a map the smaller towns or cities. By means of my present invention, therefore, as above described, it will be appreciated that such location of the smaller towns may be readily found and its position on the map observed without requiring a more or less detailed inspection of the map surface. It will be seen that I have eliminated the usual key system and thus avoided a complication of the delineated map by the printing thereon of a large number of intersecting lines dividing the surface of the map into smaller rectangular fields, as has heretofore been the practice. In cases where the map is printed upon a separate sheet or on a folded sheet bound in a volume and on opaque or semi-opaque paper, it is not necessary to mark or mutilate the sheet as the guide lines 10 may be readily followed by the line and the finger merely placed at the terminus thereof. Upon then turning the sheet, the location of the town or city at a point opposite the user's finger will be readily observed.

From the foregoing description considered in connection with the accompanying drawing, the nature of my present invention and the advantages thereof in practical use will be readily understood. While I have referred to my present invention as particularly designed for use in connection with maps to locate towns and cities thereon, it will be understood that the invention might also be advantageously employed in connection with large scale maps of cities for the purpose of readily locating the different streets thereof. Accordingly, it is to be understood that the invention is not necessarily limited to the precise embodiment illustrated in the drawing and I, therefore, reserve the privilege of resorting to all such changes as may be fairly considered within the spirit and scope of the invention as claimed.

I claim:

1. A map comprising a sheet having a map delineated upon one face thereof with town locus designations and town names adjoining the designations, an alphabetical schedule of the town names upon the opposite face of the sheet, locus designations upon such opposite face of the sheet placed in register with the town locus designations on the map face of the sheet, and lead lines extending from the town names in the schedule on the opposite face of the sheet to the corresponding locus designations on such opposite face of the sheet.

2. A map comprising a sheet of puncturable material having a map section delineated on its obverse face with locus designations and names opposite such locus designations, said sheet having on the reverse face thereof ruled columns and an alphabetical schedule of the names appearing on the map disposed in said columns, locus designations on the reverse face of the sheet corresponding in character and position to the locus designations on the obverse face of the sheet whereby a pointed instrument applied to the locus designation on the reverse face will project through the sheet and coincide with the locus designation on the obverse face of the sheet, and lead lines on the reverse face of the sheet extending from the names in the schedule to respective locus designations on the reverse face of the sheet.

In testimony that I claim the foregoing as my invention I have signed my name hereunder.

PATRIK ANDERSSON.